US007227849B1

(12) United States Patent
Räsänen

(10) Patent No.: US 7,227,849 B1
(45) Date of Patent: Jun. 5, 2007

(54) IMPLEMENTATION OF MULTIPLE SIMULTANEOUS CALLS IN A MOBILE COMMUNICATION SYSTEM

(75) Inventor: Juha Räsänen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/647,784

(22) PCT Filed: Apr. 8, 1999

(86) PCT No.: PCT/FI99/00294

§ 371 (c)(1),
(2), (4) Date: Oct. 5, 2000

(87) PCT Pub. No.: WO99/53704

PCT Pub. Date: Oct. 21, 1999

(30) Foreign Application Priority Data

Apr. 9, 1998 (FI) ...................................... 980828

(51) Int. Cl.
*H04Q 7/00* (2006.01)
*H04B 7/208* (2006.01)

(52) U.S. Cl. ...................... 370/329; 370/335; 370/342; 370/441; 370/458; 370/465

(58) Field of Classification Search ................ 370/328, 370/329, 335, 336, 326, 337, 342–345, 347–349, 370/431, 433, 441–443, 458, 459, 463–465, 370/477, 479, 480, 448, 535, 537, 468, 522, 370/524

See application file for complete search history.

(56) References Cited

U.S. PATENT DOCUMENTS 5,448,621 A    9/1995 Knudsen (Continued)

FOREIGN PATENT DOCUMENTS

GB          2 296 844        7/1996

(Continued)

OTHER PUBLICATIONS

Ishikawa et al., "Radio Resource Control for Supporting Multi-Call on W-CDMA System," Proceedings of the 1998 IEICE General Conference, Mar. 27-30, 1998.

*Primary Examiner*—Seema S. Rao
*Assistant Examiner*—Robert C. Scheibel, Jr.
(74) *Attorney, Agent, or Firm*—Pillsbury Winthrop Shaw Pittman LLP

(57) ABSTRACT

The invention relates to implementation of multiple simultaneous calls for a mobile station in a mobile communication system. A common traffic channel (TCH) is allocated to several simultaneous calls (applications 1–n) of the mobile station (MS), so that the calls share the capacity of the common channel. Logical links are established for each call inside a common radio link protocol or link access control protocol, which is established over the common traffic channel between the mobile station (MS) and an interworking function (IWF). The common traffic channel (TCH) is allocated when the first call or calls are set up, and the capacity of the traffic channel is adjusted dynamically during the calls. The capacity of the common traffic channel is increased or the allocated capacity is reallocated when a new call is added to the traffic channel. Correspondingly, the capacity is decreased or the allocated capacity is reallocated when a call is cleared from the common traffic channel. The common traffic channel is released after the last call has been cleared.

10 Claims, 8 Drawing Sheets

U.S. PATENT DOCUMENTS

| | | | |
|---|---|---|---|
| 5,570,355 A * | 10/1996 | Dail et al. .................. 370/352 |
| 5,583,869 A * | 12/1996 | Grube et al. ................ 370/347 |
| 5,590,406 A * | 12/1996 | Bayley et al. .............. 370/493 |
| 5,638,371 A * | 6/1997 | Raychaudhuri et al. .. 370/310.2 |
| 5,757,792 A * | 5/1998 | Aoki .......................... 370/347 |
| 5,901,143 A * | 5/1999 | Rotter et al. ............... 370/329 |
| 6,014,089 A * | 1/2000 | Tracy et al. ........... 340/870.02 |
| 6,041,051 A * | 3/2000 | Doshi et al. ................ 370/352 |
| 6,055,242 A * | 4/2000 | Doshi et al. ................ 370/458 |
| 6,081,536 A * | 6/2000 | Gorsuch et al. ............ 370/468 |
| 6,112,084 A * | 8/2000 | Sicher et al. ............... 370/337 |
| 6,112,092 A | 8/2000 | Benveniste |
| 6,144,647 A * | 11/2000 | Lopez-Torres ............. 370/329 |
| 6,219,341 B1 * | 4/2001 | Varanasi ..................... 370/252 |
| 6,363,058 B1 * | 3/2002 | Roobol et al. ............. 370/310 |
| 6,400,701 B2 * | 6/2002 | Lin et al. .................... 370/336 |
| 6,477,176 B1 * | 11/2002 | Hamalainen et al. ....... 370/435 |
| 2002/0071409 A1 * | 6/2002 | Proctor, Jr. ................. 370/335 |

FOREIGN PATENT DOCUMENTS

| | | |
|---|---|---|
| GB | 2 320 162 | 6/1998 |
| JP | 09107344 A | 4/1997 |
| JP | 9214459 | 8/1997 |
| WO | WO 96/22655 | 7/1996 |
| WO | WO 97/40591 | 10/1997 |
| WO | WO 99/16264 | 4/1999 |

* cited by examiner

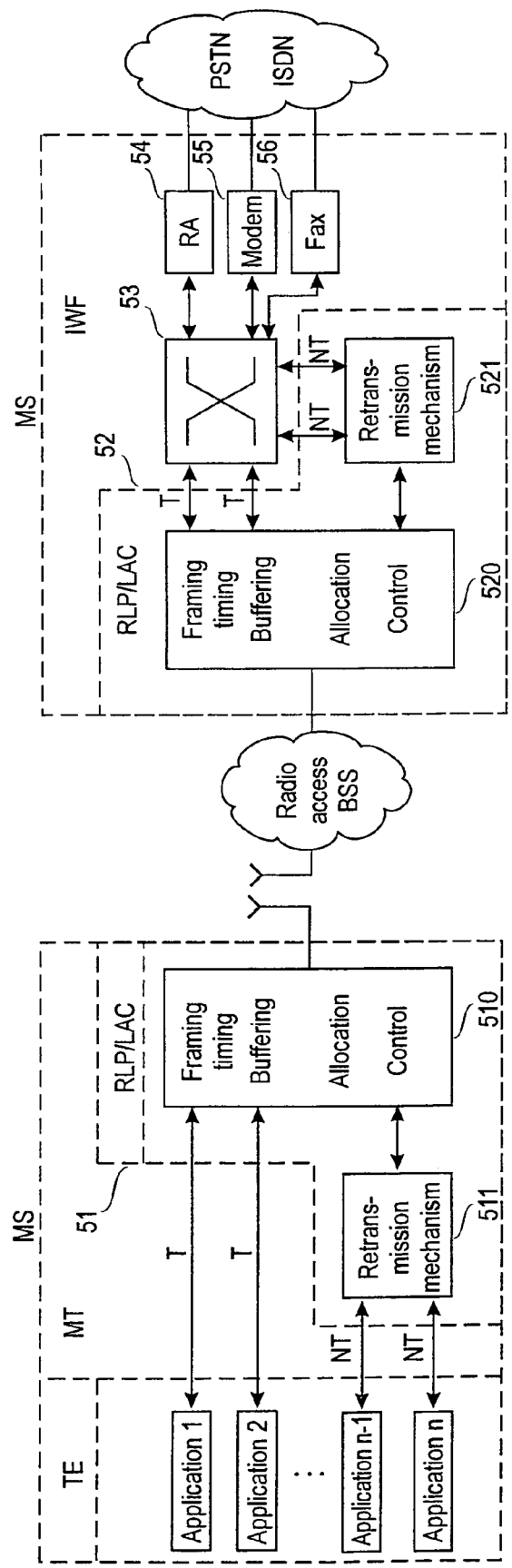

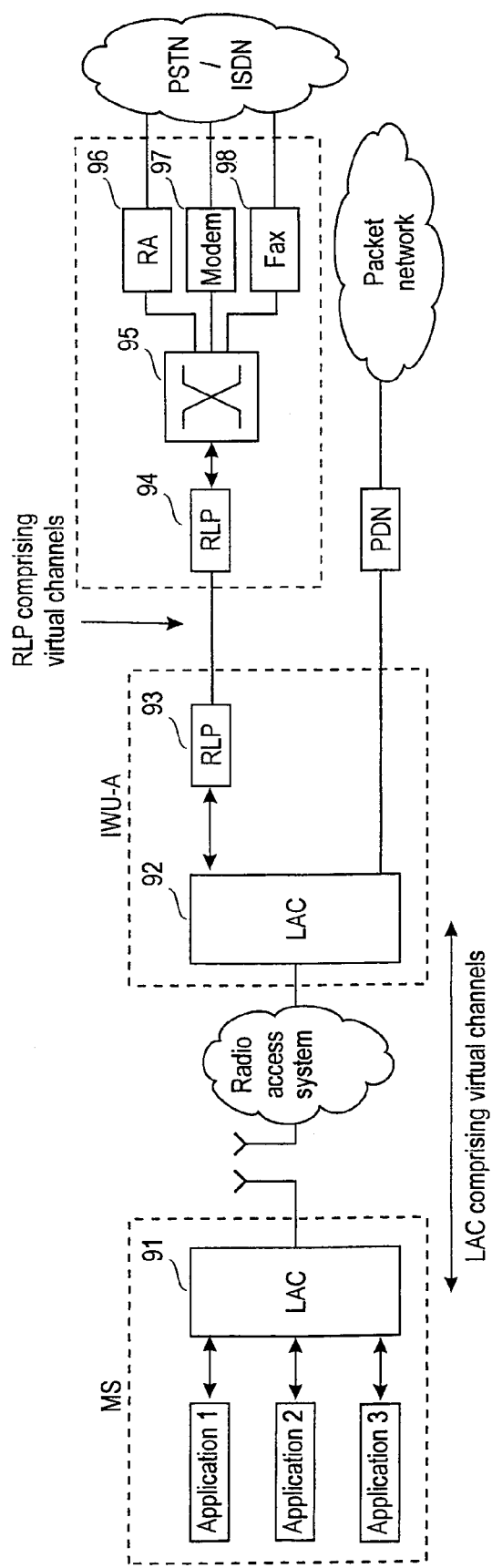

IMPLEMENTATION OF MULTIPLE SIMULTANEOUS CALLS IN A MOBILE COMMUNICATION SYSTEM

This application is the national phase of international application PCT/FI99/00294 filed Apr. 8, 1999 which designated the U.S.

FIELD OF THE INVENTION

The invention generally relates to mobile communication systems and particularly to multiple simultaneous calls in a mobile communication system.

BACKGROUND OF THE INVENTION

In addition to conventional speech transmission, modern mobile communication systems offer various data transmission services to subscribers. The services of mobile communication systems are generally classified into tele-services and bearer services. A bearer service is a telecommunications service which provides signal transmission between the user interfaces and the network interfaces. An example of bearer services is a modem service. In the tele-service terminal services are also offered by the network. Important tele-services include speech, telefax and videotex services. The bearer services are usually subdivided into groups, such as asynchronous bearer services and synchronous bearer services, on the basis of a certain feature. In the case of the asynchronous bearer service the transmitting terminal and the receiving terminal are able to maintain their synchronization only for each single character to be transmitted. In the case of the synchronous bearer service the transmitting terminal and the receiving terminal are synchronized with each other for the whole duration of data transmission. Each such bearer service group comprises a number of bearer services, such as a transparent service and a non-transparent service. In the transparent service the data to be transmitted is unstructured and transmission errors are corrected only by means of channel coding. In the non-transparent service the data to be transmitted is structured into protocol data units (PDU) and transmission errors are corrected using retransmission protocols (in addition to channel coding).

Calls have traditionally been calls with one service (one connection), i.e. each call has been clearly e.g. a speech call or a data call of a certain type and optimized for a certain service. Multimedia calls which simultaneously support various types of information transmission or services, such as video, speech, file transfer, have recently been introduced in fixed data networks, particularly in the Internet.

Existing mobile communication systems do not offer any special bearer services for multimedia calls or for simultaneous use of multiple data services. There is only one traffic channel available for a data call, the channel being either transparent (T) or non-transparent (NT). Depending on the required transmission rate a traffic channel may consist of one sub-channel (e.g. TDMA time slot) or several sub-channels (e.g. several TDMA time slots for high-speed data transmission, such as HSCSD in the GSM system). Any shared use of the traffic channel has to be implemented on the application layer, i.e. in the end user's applications. Time-critical multimedia calls, e.g. video phoning, have to use transparent circuit-switched bearer services because other data services cannot guarantee as small variation of the transmission delay as the video service requires. Too long a transmission delay causes visible interference in the video picture at the receiving end. Applications which are not time-critical and require accurate transmission usually use non-transparent bearer services. An example of such an application is transfer of data files.

As was stated above, the problem related to the present mobile communication systems is that they either provide a transparent or non-transparent traffic channel or a packet service (such as GPRS, General Packet Radio Service) for a multimedia call between two mobile stations or between a mobile station and a terminal or server in a fixed communication network. Packet radio services and the non-transparent traffic channel are not suitable for video phoning or other time-critical applications. On the application layer the transparent bearer service requires an error correction protocol which is usually not optimized for a radio connection. This means that a multiservice and/or multimedia channel has to always use a transparent bearer service and perform multiplexing and error correction on the application layer in the end users' terminals.

In the future it will be required of the mobile communication systems, particularly of the $3^{rd}$ generation systems, such as UMTS (Universal Mobile Telecommunications Systems) that the mobile communication network and mobile station should support several simultaneous calls between the mobile station and several other parties at different destinations. The calls may be traditional calls with one connection or above-described multimedia calls or calls with multiple connections. It is also required that it should be possible to add or drop different connections or calls independently of one another.

The key factor in the design and implementation of mobile communication networks is the effective utilization of the radio spectrum. Multiple calls should also be implemented by making the maximum use of the channel capacity. Control of multiple calls, e.g. handover, should be as simple as possible both for the mobile communication system and the mobile station.

DISCLOSURE OF THE INVENTION

One of the objectives of the invention is to meet the above-mentioned requirements, particularly the effective utilization of the available channel capacity and simple handover procedure of multiple simultaneous calls.

This is achieved with a method of providing two or more simultaneous data calls for one mobile station in a mobile communication system. The method is characterized by the following steps of assigning only one common traffic channel to two or more simultaneous calls of a mobile station, and sharing the capacity of the traffic channel between the simultaneous calls.

The invention also relates to a mobile station according to claim 13 and to a mobile communication network according to claim 19.

According to the basic idea of the invention, one common traffic channel is reserved for several or all simultaneous calls of a mobile station, and the capacity of the channel is shared between the calls. Here the term traffic channel refers both to a single channel and to a set of two or more parallel sub-channels used in high-speed multichannel data transmission (e.g. the HSCSD channel of the GSM system). The term call means both a traditional call with one connection and a multimedia call or a multiple connection call. The traffic channel is reserved when the first call or calls are being set up. If several calls are set up simultaneously, the capacity of this one common traffic channel is determined by the combined (total) capacity requirement of the different calls. In the preferred embodiment of the invention the capacity of the traffic channel is adjusted dynamically. The capacity of a traffic channel which is already allocated to one or more ongoing calls is increased or the allocated capacity is reallocated when a new call or a new connection of an old call is added to the traffic channel. Correspondingly, the capacity is reduced or the allocated capacity is reallocated when a call or a connection of a call is cleared (dropped) from a traffic channel. The traffic channel is released after the last call has been cleared.

The calls may be non-transparent calls (NT), transparent calls (T) or multimedia calls which contain both NT and T connections. Thus the transparent connection of the multimedia call can be used for transmitting time-critical information which does not allow the use of an error correction protocol based on retransmission, and the non-transparent connection can be used for transmitting less time-critical information which allows error correction based on retransmission. Thus the invention enables implementation of multiservice calls through the traditional traffic channel of the mobile communication network. The necessary multiplexing and demultiplexing can be carried out in the terminals and interworking functions of the mobile communication network. Thus these functions do not need to be performed on the application layer by the end user like in prior art solutions.

In an embodiment of the invention NT calls, T calls and separate T or NT connections use logical links inside a common radio link protocol (RLP) or link access control protocol (LAC), which is established between the mobile station and the interworking function.

The call may also be a packet-switched call, in which case packet-switched traffic is transmitted over the same traffic channel with circuit-switched traffic. The packet-switched traffic preferably shares the traffic channel capacity available for NT traffic. The packets are transmitted e.g. interleaved with RLP or LAC protocol frames or encapsulated in the protocol frames.

According to another embodiment of the invention, if the mobile communication network is temporarily unable to allocate more transmission capacity or the required amount of capacity when a new call or connection is established, the available capacity is reallocated to the calls. The mobile communication network allocates the requested capacity later when capacity becomes available in the network.

According to still another embodiment, the mobile station and/or the network monitor(s) the traffic of at least one call or connection, and if there is temporarily no data traffic in the call or connection, it temporarily uses the free resources for the traffic of another call (calls) or connection (connections). Thanks to this all capacity that is free in the traffic channel can be utilized to the maximum extent every moment.

The invention optimizes the use (utilization) of the traffic channel capacity compared to a case in which separate simultaneous calls of a mobile station use different traffic channels. In the case of congestion, i.e. during the traffic peaks, the mobile communication network can support a higher number of calls with the same amount of available traffic channel capacity. The traffic channel capacity can be adjusted dynamically and allocated depending on the number of calls and their requirements. Control of simultaneous calls is simpler. For example, handover of several calls is simple to implement both in respect of the mobile communication network and the mobile station because only one traffic channel needs to be handed over. Consequently, traditional handover procedures can be applied as such, which is an advantage particularly when multicall service is introduced into existing mobile communication systems.

BRIEF DESCRIPTION OF THE DRAWINGS

In the following the preferred embodiments of the invention will be described with reference to the accompanying drawings, in which FIG. 4 illustrates a more detailed equipment configuration which allows implementation of several simultaneous circuit-switched calls of the same mobile station MS in the GSM environment inside a common RLP/LAC link, FIG. 10 is a more detailed block diagram of the system configuration illustrated in FIG. 9.

DESCRIPTION OF THE PREFERRED EMBODIMENTS

The present invention is applicable to all digital wireless telecommunications systems, such as cellular systems, WLL (Wireless Local Loop) and RLL (Radio Local Loop) networks, satellite-based mobile communication systems, etc. Here the term mobile communication system (or network) generally refers to all wireless telecommunications systems. There are several multiple access modulation techniques which facilitate traffic involving a large number of mobile users. These techniques include time division multiple access (TDMA), code division multiple access (CDMA) and frequency division multiple access (FDMA). The physical concept of the traffic channel varies in different multiple access methods, being primarily defined by means of a time slot in TDMA systems, by means of a spreading code in CDMA systems, by means of a radio channel in FDMA systems, by means of a combination of these, etc. In modern mobile communication systems it is possible to allocate a set of two or more basic-rate traffic channels (sub-channels), i.e. a high-speed traffic channel, to a mobile station for high-speed data transmission. Here the term traffic channel refers both to a single basic-rate traffic channel and to a high-speed traffic channel consisting of two or more basic-rate traffic channels. The basic idea of the present invention is independent of the type of the traffic channel and the multiple access method used.

The present invention is particularly suitable for data transmission applications in the $3^{rd}$ generation mobile communication systems, such as UMTS, in digital GSM mobile communication systems (Global System for Mobile Communications) and in other GSM-based systems, such as DSC1800 (Digital Communication System), in the US digital cellular system PCS (Personal Communication System) and in WLL systems which are based on the above-mentioned systems. The invention will be described below using the GSM mobile communication system as an example. The structure and function of the GSM system are very familiar to a person skilled in the art and they are defined in the GSM specifications of ETSI (European Telecommunications Standards Institute). Reference is also made to *GSM System for Mobile Communication*, M. Mouly and M. Pautet, Palaiseau, France, 1992; ISBN: 2-9507190-0-7.

Figure 1:
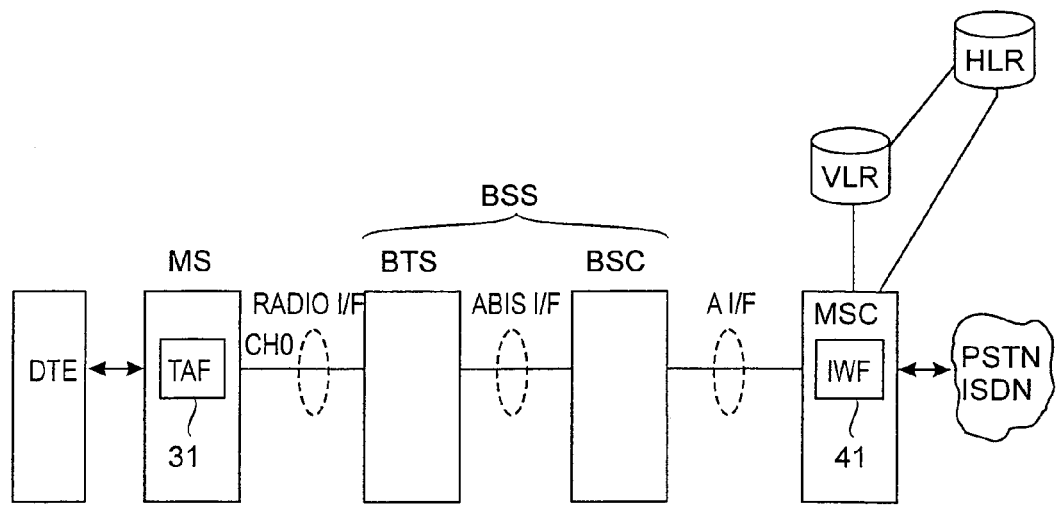
FIG. 1 illustrates a GSM mobile communication system.

The basic structure of the GSM system is illustrated in FIG. 1. The GSM system consists of two parts: a base station system BSS and a network subsystem NSS. The BSS and mobile stations MS communicate over radio connections. In the base station system BSS each cell is served by a base transceiver station BTS. A number of base transceiver stations are connected to a base station controller BSC, which controls the radio frequencies and channels the BTS uses. The BSCs are connected to a mobile services switching centre MSC. Certain MSCs are connected to other telecommunications networks, such as the public switched telephone network PSTN, and comprise gateway functions for calls transmitted to those networks and calls arriving from those networks. These MSCs are known as gateway MSCs (GMSC). There are also at least two databases, a home location register HLR and a visitor location register VLR.

The mobile communication system comprises adaptation functions for adapting the internal data connection of the mobile communication network to the protocols used by the terminals and other telecommunications networks. The adaptation functions typically include a terminal adaptation function TAF on the interface between the mobile station and the data terminal connected to the mobile station and an interworking function IWF on the interface between the mobile station and another telecommunications network, typically in association with the mobile services switching centre. Usually the mobile services switching centre comprises various kinds of adapter equipment pools for supporting different data services and data protocols, such as a modem pool which comprises modems and telefax adapters for modem and telefax services, UDI/RDI rate adapter pool, etc. Referring to FIG. 1, in the GSM system a data connection is established between the terminal adaptation function TAF 31 of the mobile station MS and the interworking function IWF 41 in the mobile communication network. In the case of data transmission in the GSM system this connection is an UDI coded digital full duplex connection adapted to V.24 interfaces. In non-transparent data services the GSM connection also uses a radio link protocol RLP. The TAF adapts the data terminal equipment DTE connected to the mobile station MS to said GSM data connection, which is established over a physical connection using one or more traffic channels. The IWF connects the GSM data connection to a V.110 or V.120 network, such as an ISDN network or another GSM network, or to another transit network, such as the public switched telephone network PSTN. The CCITT recommendation for a V.120 rate-adapted connection is disclosed in the publication CCITT White Book: V.120.

As was explained above, modern mobile communication systems support different tele-services and bearer services. The bearer services of the GSM system are defined in the GSM specification 02.02 and the tele-services in the GSM specification 02.03.

Figure 2:
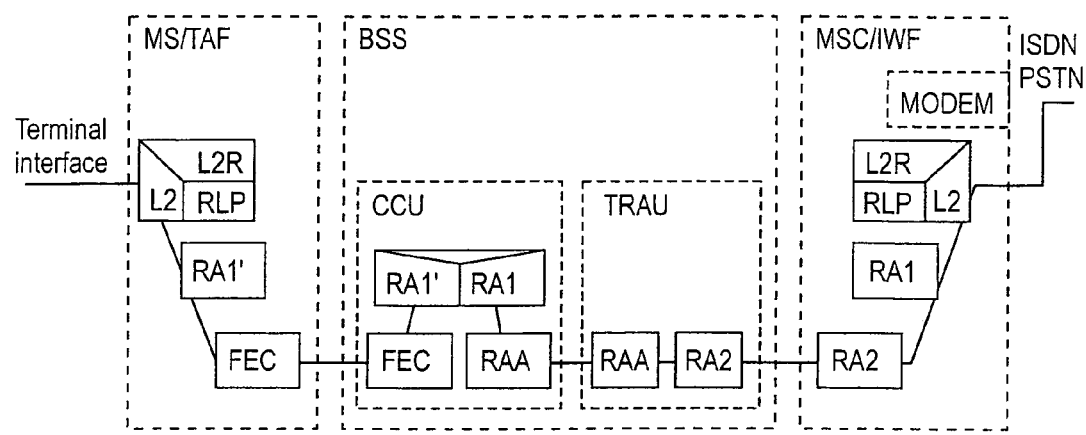
FIG. 2 illustrates protocols and functions that are needed in non-transparent bearer services of the GSM system.

FIG. 2 illustrates protocols and functions which are needed in the IWF (either in the MSC or in a WLL-specific network element) for non-transparent bearer services. The non-transparent circuit-switched connection over the GSM traffic channel between the terminal adaptation function TAF and the interworking function IWF comprises several protocol layers which are common to all these services. These include various rate adaptation functions RA, such as RA1' between the terminal adaptation function TAF and the CCU unit (Channel Codec Unit) located in the base station system BSS, RA1 between the CCU unit and the interworking function IWF, RAA between the CCU unit and a transcoder unit TRAU located remote from the base station, and RA2 between the transcoder unit TRAU and the interworking function IWF. Rate adaptation functions RA are defined in GSM recommendations 04.21 and 08.20. Traffic between the CCU unit and the transcoder unit TRAU is defined in the GSM recommendation 08.60. At the radio interface the RA1' rate-adapted information has also been channel-coded according to the GSM recommendation 5.03, which is illustrated by the FEC blocks in the mobile station MS and CCU unit. The IWF and TAF also comprise protocols of upper layers which are service-specific. In the asynchronous non-transparent bearer service the L2R (Layer 2 Relay) and RLP (Radio Link Protocol) protocols and a modem or a rate adaptation function in the direction towards the fixed network are needed in the IWF. L2R functionality for non-transparent character-oriented protocols is defined e.g. in the GSM recommendation 07.02. The RLP protocol is defined in the GSM recommendation 04.22. The RLP is a frame-structured, balanced (HDLC type) data transmission protocol in which error correction is based on retransmission of corrupted frames at the request of the receiving party. The interface between the IWF and e.g. the audiomodem MODEM is in accordance with CCITT V.24. In FIG. 2 this interface is indicated with symbol L2. This non-transparent configuration is also used in connection with access to the Internet network.

The protocol structure of the transparent bearer service and GSM telefax service is very similar to that illustrated in FIG. 2, except that the L2R/RLP function has been replaced with another function. In an asynchronous transparent bearer service the IWF needs asynchronous-synchronous conversion RA0 and a modem or a rate adaptation function in the direction towards the fixed network. In the telefax service the IWF needs GSM telefax protocol functions and a modem. The telefax connection is also transparent. The GSM telefax service is defined in the GSM recommendation 03.45.

In the HSCSD concept of the GSM system a high-speed data signal is splitted into separate data flows which are then transmitted via N subchannels (N traffic channel time slots) on the radio interface. After the data flows have been splitted, they are carried on subchannels as if they were independent of one another until they are combined again in the IWF or MS. However, logically these N subtraffic channels belong to the same HSCSD connection, i.e. they form one HSCSD traffic channel. According to the GSM recommendations, data flows are splitted and combined in a modified RLP, which is thus common to all subchannels. Below this common RLP each subchannel has the same protocol stack RA1'-FEC-FEC-RA1'-RAA-RAA-RA2-RA2-RA1 between the MS/TAF and the MSC/IWF, the protocol stack being illustrated for one traffic channel in FIG. 2. Thus the HSCSD traffic channel according to the GSM recommendations will still use the common RLP for different subchannels, even though the bit rate of an individual subchannel may be up to 64 kbits/s.

As was stated above, solutions are being developed for the GSM system which enable data rates up to 64 kbits/s per time slot or data rates exceeding 64 kbits/s in the multi-slot constellation (HSCSD). However, this development work does not affect the protocol structures described above, but only the bit rate of the HSCSD traffic channel. Thus the HSCSD traffic channel according to the GSM recommendations will still use the common RLP for different subchannels, even though the bit rate of an individual subchannel may be up to 64 kbits/s and the total rate of the HSCSD traffic channel n*64 kbit/s.

As was explained above, in the future it will be required of the mobile communication systems, particularly of the 3$^{rd}$ generation systems, such as UMTS (Universal Mobile Telecommunications Systems) that the mobile communication network and the mobile station should support several simultaneous calls between the mobile station and several other parties at different destinations. The calls may be traditional calls with one connection or multimedia calls or calls with several connections. It is also required that it should be possible to add or drop separate connections or calls independently of one another. The channel capacity should be utilized as efficiently as possible. In addition, control of multiple calls, such as handover, should be as simple as possible both for the mobile communication system and the mobile station.

According to the basic idea of the invention one common traffic channel is allocated to several or all simultaneous calls of the same mobile station and the capacity of the channel is shared between the calls.

Figure 3:
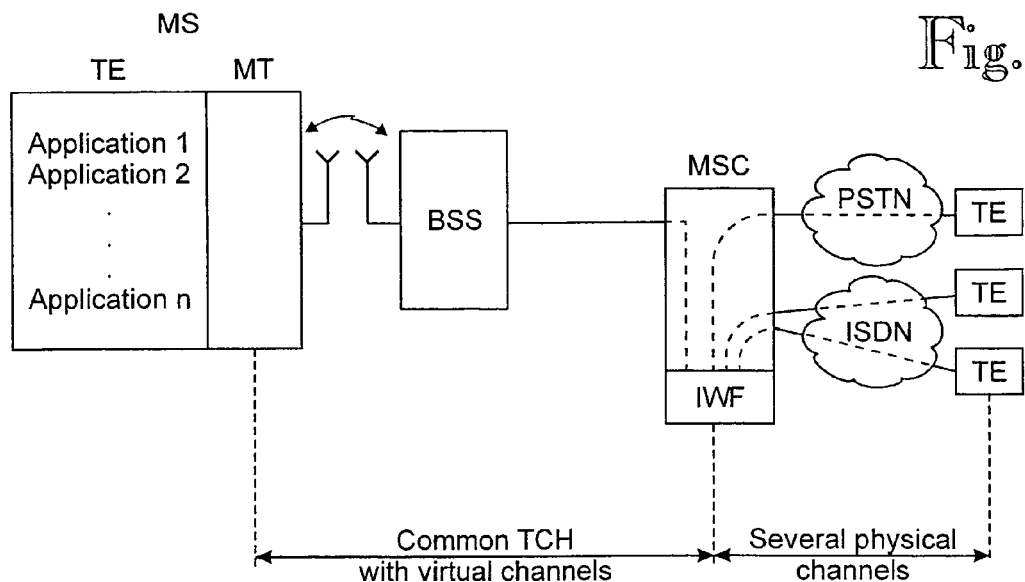
FIG. 3 illustrates a system configuration where several simultaneous circuit-switched calls of the same mobile station MS can be implemented in the GSM environment.

FIG. 3 illustrates by way of example how several simultaneous circuit-switched calls of the same mobile station can be implemented in the GSM environment. There are n active applications in the terminal TE of the mobile station MS, and each of the different applications requires one call or one connection of a multimedia call. One traffic channel has been established between the mobile station MS and the interworking function IWF, the channel being common to all calls. A virtual connection (circuit) is established for each call or connection of a call inside the common traffic channel and each virtual connection uses part of the traffic channel's capacity. The MS connects each application to its respective virtual connection in the traffic channel. The interworking function IWF connects the virtual connections of the traffic channel to separate physical fixed network channels. One such fixed network channel is established between the terminals TE of the fixed network (e.g. PSTN or ISDN) and the interworking function IWF for each call. The fixed network channel may also comprise several connections (multimedia call).

The calls may be for example non-transparent calls (NT), transparent calls (T) or multimedia calls which comprise both NT and T connections. Furthermore, one or more calls may be packet-switched.

The capacity of the common traffic channel can be allocated to the calls e.g. by allocating specific information bits transmitted through the traffic channel to each call or connection of a call. In the GSM system, for example, V.110 frames are transmitted between the rate adaptation function RA1' and the rate adaptation function RA1. A specific number of the data bits of these frames may be reserved for each call.

In the preferred embodiment of the invention NT calls, T calls and separate T or NT connections use logical links inside a common radio link protocol (RLP) or link access control protocol (LAC) which is established through the traffic channel between the mobile station MS and the interworking function IWF (or IWU-A).

Figure 6:
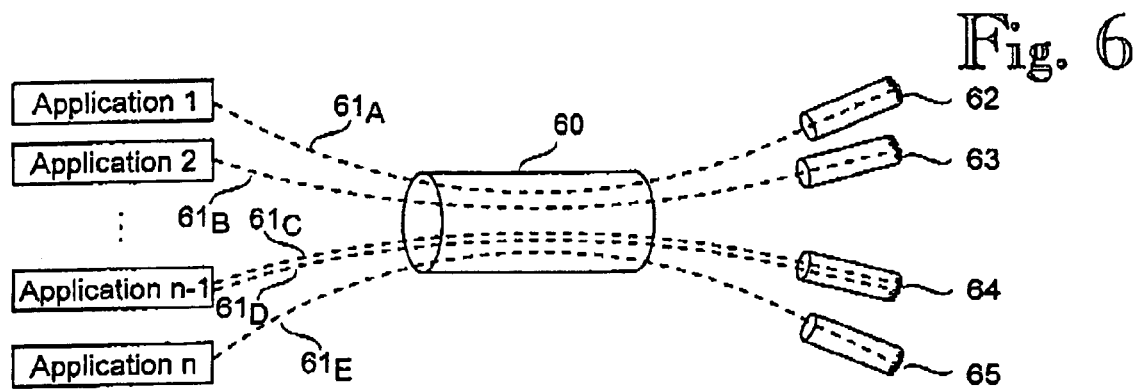

FIGS. 4 and 6 illustrate such data transmission configuration for pure circuit-switched applications in the GSM environment.

Referring to FIG. 4, the terminal TE (such as a personal computer) of the mobile station MS comprises a number of applications 1 . . . n, some of the applications requiring transparent calls (T) and some non-transparent calls (NT). The applications 1 . . . n are connected to the radio terminal part MT of the mobile station MS through an application interface, such as Mobile API/MEXE (Mobile Application Programming Interface/Mobile Execution Environment). The MT comprises an RPL/LAC unit 51, which supports the radio link protocol RLP or another suitable link access control protocol LAC. The RLP/LAC unit 51 comprises two functional parts, i.e. a control unit 510 and a retransmission mechanism 511. The control unit 510 performs all functions related to the RLP/LAC protocol, including framing, timing, buffering of data, allocation of virtual channels, multiplexing/demultiplexing of different calls to the virtual channels of the common traffic channel, and control of RLP/LAC protocol functions. Only functions and mechanisms related to retransmission have been transferred to the unit 511. Applications requiring a transparent (T) connection or call have been directly connected to the unit 510, whereas applications requiring a non-transparent (NT) call or connection have been connected to the unit 510 via the retransmission unit 511. This allows to transmit both transparent and non-transparent connections inside the common RLP/LAC link in one GSM traffic channel.

Referring further to FIG. 4, the interworking function IWF, which is preferably located in the mobile services switching centre MSC, comprises an RLP/LAC unit 52, which corresponds to the unit 51 in the mobile station MS. In other words, the RLP/LAC unit 52 comprises a control unit 520 and retransmission mechanism 521, which have the same functionality as the respective units 510 and 511 in the mobile station MS. The I/O ports of the unit 520 (which are intended for transmitting and receiving transparent (T) data to and from the fixed network (PSTN, ISDN)) are connected to a switching unit 53, which may connect each port selectively to a rate adaptation unit RA 54, modem 55 or telefax protocol adapter FAX 56, for example. Units 54, 55 and 56 are connected to other telecommunications networks, such as PSTN or ISDN. Correspondingly, the ports of the unit 521 (which are intended for transmitting and receiving non-transparent data to and from another telecommunications network) are connected to the switching unit 53, which can selectively connect the ports to units 54 to 56 according to the service a given call requires. Thanks to the IWF according to FIG. 4 different calls or connections (one in each port of the unit 520 or 521) can thus be connected selectively and independently of other calls to a separate individual physical channel in another telecommunications network. Alternatively, it may be advantageous in some situations to connect two calls or connections to the same physical channel in another telecommunications network, e.g. when the calls have the same destination.

One common traffic channel is allocated between the mobile station MS and the interworking function IWF when the first call or calls are set up. If several calls are set up simultaneously, the capacity of the common traffic channel is determined by the combined (total) capacity requirement of the different calls.

In normal GSM call set-up the MSC receives a BCIE element (Bearer Capability Element) in the set-up message from the mobile station (or from the subscriber database or another switching centre). The BCIE element includes information on the call type as well as on the bearer services and the protocol the call requires. On the basis of this information the MSC can select and initialize the IWF equipment suitable for the call in question. In an embodiment of the invention the BCIE element can be provided with a new parameter or parameter value which enables the MSC to choose the IWF equipment supporting the functionality of the invention for the call.

Figure 5:
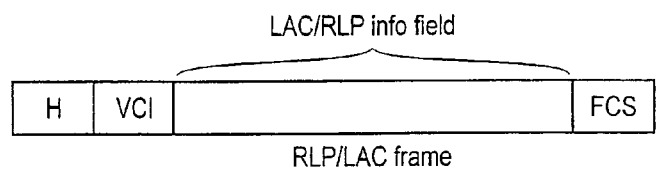
FIG. 5 illustrates an RLP/LAC frame which includes a virtual channel identifier, FIG. 6 graphically illustrates virtual channels inside a common traffic channel in the embodiment of FIG. 4.

When the common traffic channel is established, an RLP/LAC protocol link is established between the RLP/LAC units 51 and 52 in the manner defined for the RLP/LAC protocol, e.g. according to the RLP protocol in the GSM mobile communication system. In the preferred embodiment of the invention the RLP/LAC units also negotiate with each other about the establishment of virtual channels (circuits) inside the common RLP/LAC protocol link by means of internal signalling of the traffic channel. In the GSM system, for example, this inband negotiation may be implemented by means of the XID mechanism and XID frames of the radio link protocol RLP, which are normally used for signalling through a non-transparent connection. The logical subchannels (circuits) can be established e.g. by determining logical channel identifiers inside the information field of the RLP/LAC frames, for instance. FIG. 5 illustrates an RLP/LAC frame provided with a logical channel identifier. The frame comprises a header (H), information field and frame check sequence FCS. The virtual channel identifier VCI of the invention is located at the beginning of the information field. The VCI preferably consists of a call identifier (which distinguishes calls from one another) and a connection identifier (which distinguishes the connections of a call from one another). Such use of several logical channels allows to run several point-to-point service sessions simultaneously through one RLP/LAC connection.

The above-mentioned inband negotiation process may be for example the following kind of process. When a common RLP/LAC link has been established in the common traffic channel, the RLP/LAC unit 51 sends a XID frame including a suggestion for a certain virtual channel allocation to the RPL/LAC unit 52. If necessary, the unit 51 acknowledges with a XID frame, after which the units 51 and 52 start to multiplex calls to subchannels in the negotiated manner. Allocation of subchannels comprises both allocation of subchannel identifiers VCI and allocation of a certain amount of channel capacity to each virtual channel. In the mobile station the unit 51 links each virtual channel with the corresponding application (call). Correspondingly, in the interworking function IWF the RLP/LAC unit 52 and switching unit 53 provide coupling of the virtual channels to the separate physical channels in another telecommunications network. Alternatively, it is also possible to include definition of the virtual channel capacity (e.g. bit rate) needed for each call or connection in the above-mentioned BCIE element or another signalling element. In that case the capacity of the common traffic channel is allocated in the IWF according to this information and no inband negotiation is needed (unless negotiation is needed for another reason).

FIG. 6 is a graphical illustration of four simultaneous calls which have been set up via the common traffic channel according to the invention. Five logical channels 61A, 61B, 61C, 61D and 61E are established inside the common traffic channel and the RLP/LAC link 60. Logical channels 61A, 61B and 61E are connected to applications 1, 2 and n, respectively, on the MS side, and correspondingly to physical PSTN/ISDN channels 62, 63 and 65 on the IWF side. The call of the application n–1 comprises two separate connections, which are connected to logical channels 61C and 61D on the MS side. On the IWF side the logical channels 61C and 61D are connected to a common physical channel 64.

After the multiple call according to the invention has been set up, the capacity of the common traffic channel can be adjusted dynamically. The capacity of a traffic channel to which one or more ongoing calls have been allocated is increased or the allocated capacity is reallocated when a new call, or a new connection of an old call, is added to the channel. When the MS requires one more call, it sends a call set-up request to the mobile services switching centre MSC, which changes the configuration of the traffic channel so that the total capacity corresponds to the capacity required by all calls. A corresponding procedure is carried out when the MS clears a call from the traffic channel. Increase or decrease of capacity may mean, for example, that 1) more or fewer subchannels or subflows are allocated in multiple channel configuration (such as HSCSD), 2) the channel coding is changed in order to increase or decrease the data rate, 3) the ratio of chip rate to data rate (chip rate over data rate) is changed in the code division multiple access system (CDMA), or other means provided by the mobile communication system in question are used. After the configuration and capacity of the common traffic channel have been changed, the RLP/LAC units 51 and 52 negotiate a virtual channel for the new call, delete the virtual subchannel of the cleared call or possibly negotiate about reallocation of the capacity to the calls. A connection can be added or deleted within an existing call as was described above, or negotiation about allocation/deallocation of a virtual channel and reallocation of the capacity may be carried out only between the units 51 and 52 due to the addition/deletion of a connection.

Also, if the MS is temporarily unable to allocate more transmission capacity to the traffic channel when a new call or connection is being added, the RLP/LAC units 51 and 52 perform negotiation, in which case a new virtual channel is established for a new call or connection and the available capacity is reallocated.

When the MS sets up a new call or connection in addition to the ongoing ones, the MSC notices that the MS is already engaged in a data call and reroutes the call/connection to the same IWF element.

Transparent (T) data is packed into RLP/LAC frames, i.e. a virtual channel is also allocated to T connections in the common traffic channel. However, retransmission functions are not applied to the T data, but an unacknowledged mode transmission because transparent (T) data is supplied directly to the RLP/LAC units 51 and 52 and not via the retransmission mechanism 511, 521. Furthermore, the transmitting RLP/LAC unit 51, 52 guarantees that a frame is transmitted to each connection at regular intervals so that a constant (or nearly constant) delay and a constant rate are kept up.

Transparent calls require a constant capacity, and thus the capacity of the transparent calls cannot be reduced when the total capacity of the traffic channel is inadequate. However, non-transparent calls and packet connections can be maintained with minimal traffic channel capacity using flow control, buffering and congestion control at both ends of the traffic channel, e.g. in the RLP/LAC units 51 and 52.

According to an embodiment of the invention the RLP/LAC units 51 and 52 monitor the traffic of transparent (T) calls and connections. If the MS, for example, detects that application 1 transmits fill data according to the protocol, e.g. flags or control frames, in a transparent call, the RLP/LAC unit 51 does not transmit the fill data to the traffic channel. Instead, the RLP/LAC unit 51 transmits RLP/LAC frames (or packets) of one or more non-transparent (or packet-switched) connections, i.e. RLP/LAC frames which contain the virtual channel identifier VCI of the non-transparent connections instead of the VCI of the transparent channel. At the receiving end the RLP/LAC unit 52 returns the missing protocol fill data to the transparent data flow, even though the fill data is not transferred via the traffic channel. This may happen e.g. so that the RLP/LAC unit 52 automatically adds a certain fill to outgoing transparent data flow when it detects that the traffic channel does not receive the RLP/LAC frame related to the T connection within a predetermined time from the previous RLP/LAC frame. The units 51 and 52 function correspondingly in the opposite transmission directions. Thanks to the additional feature of this invention all free capacity in the traffic channel is utilized efficiently every moment.

The present invention is also suitable for simultaneous transmission of circuit-switched data and packet-switched data. Packet-switched traffic is transmitted on the same channel with the circuit-switched traffic. The packet-switched traffic preferably shares the capacity of the traffic channel, which is available for NT traffic. Packets are transmitted e.g. interleaved with RLP or LAC protocol frames or encapsulated in the protocol frames.

Figure 7:
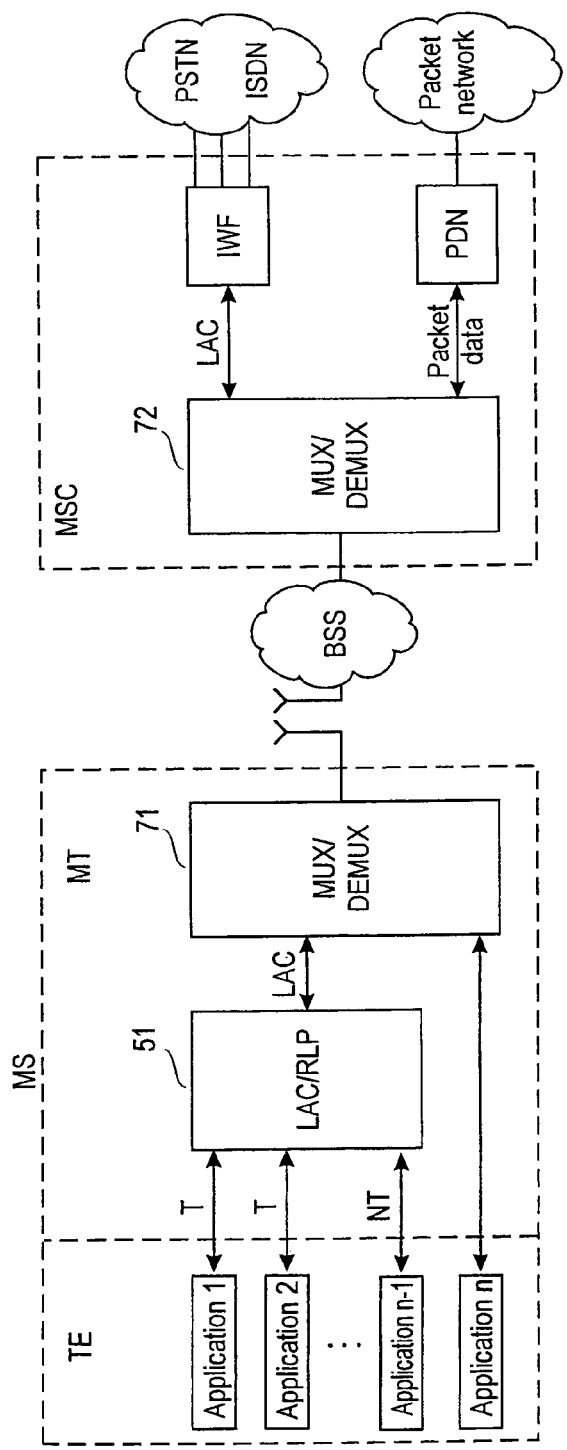
FIG. 7 illustrates a system configuration where simultaneous circuit-switched and packet-switched calls of the same mobile station MS can be implemented in the GSM environment.
Figure 8:
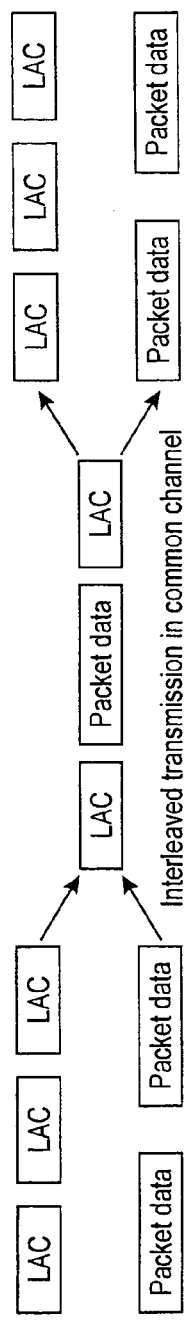
FIG. 8 illustrates transmission of interleaved packet data frames and LAC frames via the common traffic channel.

FIGS. 7 and 8 illustrate simultaneous transmission of circuit-switched data and packet switched-data in the GSM environment. The terminal TE of the mobile station comprises data applications 1 ... n, each of which requires a dedicated call or connection. The applications 1 ... n establish circuit-switched transparent (T) or non-transparent (NT) connections which are connected to the LAC/RLP unit 51 in the MT part of the mobile station MS. The structure and functions of the RLP/LAC unit 51 are preferably identical to those of the unit 51 illustrated in FIG. 4.

The mobile services switching centre MSC comprises an interworking function IWF which is preferably identical to the interworking function IWF illustrated in FIG. 4. To be more precise, the IWF comprises an RLP/LAC unit 52, switching unit 53 and rate adaptation function RA 54, modem and telefax unit 56, which are connected to physical channels in another telecommunications network, such as PSTN or ISDN. The RLP/LAC unit 51 and the interworking function IWF establish an RLP/LAC link between themselves via the common traffic channel. The RLP/LAC link comprises virtual channels for each call or connection, as was described above with reference to FIGS. 4, 5 and 6. Circuit-switched data is transferred between the unit 51 and the IWF in RLP/LAC frames.

Referring further to FIG. 7, the application n (or alternatively several data applications) is a packet data application which requires a packet data call in a packet data network. In the embodiment illustrated in FIG. 7 packet data frames are transmitted interleaved with the RLP/LAC frames in the common traffic channel. For this purpose the packet data frames produced by the application N and the RLP/LAC frames produced by the unit 51 are supplied to a multiplexing and demultiplexing unit 71, which multiplexes the LAC frames and packet data frames to the common traffic channel in proportion to the transmission channel capacity allocated to them. There is a corresponding multiplexing and demultiplexing device 72 in the mobile services switching centre MSC, which demultiplexes the RLP/LAC frames from packet data frames. The RLP/LAC frames are supplied to the interworking function IWF. The packet data frames are supplied to a packet data node or packet data handler PDN, which transmits them further to the packet network. Multiplexing of the LAC frames and packet data frames, their interleaved transmission on the common traffic channel and demultiplexing according to the invention are illustrated graphically in FIG. 8. Transmission of packet data and circuit-switched data occurs in the same way in the opposite direction MSC-MS.

Figure 9:
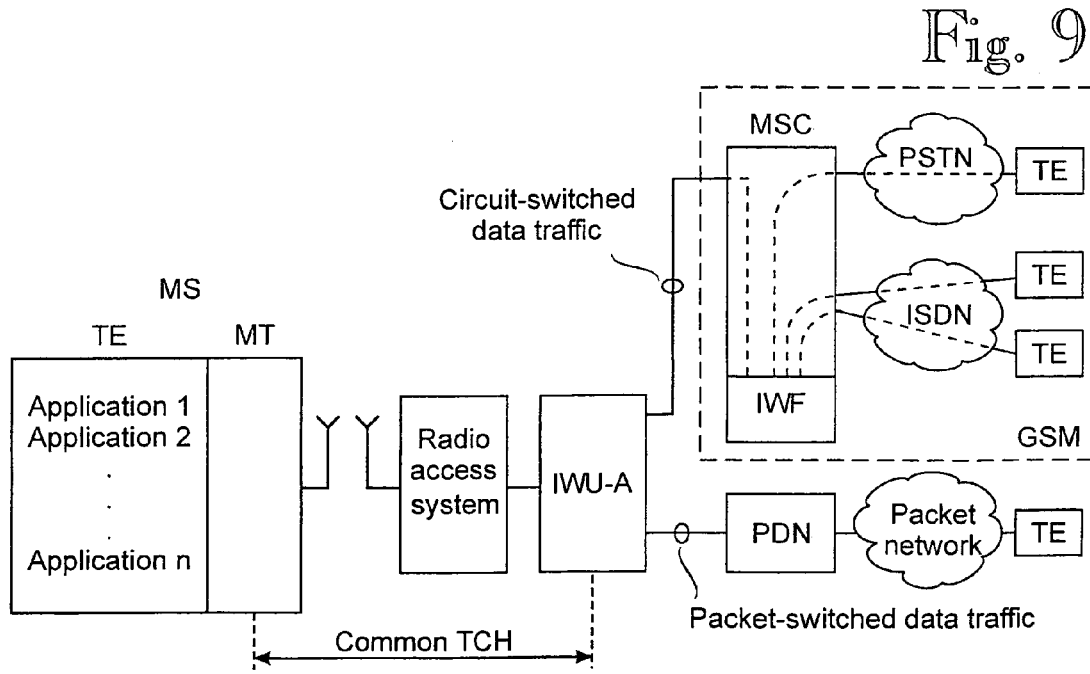
FIG. 9 illustrates a system configuration where simultaneous circuit-switched and packet-switched calls of the same mobile station MS can be implemented in a $3^{rd}$ generation radio access system, such as UMTS.

FIG. 9 illustrates how several simultaneous circuit-switched and packet-switched calls of the same mobile station MS may be implemented in the third generation radio access network, e.g. UMTS. The radio access network is connected to core networks by means of an interworking function unit or units IWU-A (add-on unit). In this example the mobile communication network and the packet network are located in the core networks. The terminal TE of the mobile station MS comprises n active applications, each of which requires one call or one connection of a multimedia call. One traffic channel which is common to all calls is established between the mobile station MS and the network adapter IWU-A as well as between the interworking functions IWU-A and IWF. A virtual connection (circuit) is established for each call or connection of a call inside the common traffic channel, each virtual connection using a specific part of the traffic channel's capacity. The IWU-A connects packet-switched calls to the packet data node PDN. Data packets are transmitted between the PDN and the packet data terminal TE via a packet-switched packet network. The IWU-A connects circuit-switched calls to the interworking function IWF. The interworking function IWF connects the virtual connections of the traffic channel to separate physical channels in the fixed network. There is one physical channel per each circuit-switched call between the fixed network terminals TE (e.g. PSTN or ISDN) and the interworking function IWF.

FIG. 10 illustrates the system of FIG. 9 in greater detail, the mobile services switching centre MSC and interworking function IWF of the system being of the GSM type. The mobile station MS comprises three data applications 1, 2 and 3, the first one of which transmits transparent circuit-switched data, the second one non-transparent circuit-switched data and the third one packet-switched data. The MS also comprises an LAC unit 91, which supports a link access control protocol LAC of a third generation mobile communication system. The first interworking function IWU-A comprises a corresponding LAC unit 92. A traffic channel of the radio access system and an LAC link is established between the LAC unit 91 and the LAC unit 92 according to the principles described with reference to FIG. 4. Virtual channels are allocated inside the LAC link (three channels in this case). The LAC unit 91 encapsulates the circuit-switched data received from applications 1 and 2 and the packet-switched data received from application 3 into LAC frames which are transmitted via the common traffic channel to the LAC unit 92. The LAC unit 92 separates the circuit-switched data from the packet-switched data. The packet-switched data is transmitted further to the packet data node PDN, which is connected to the packet data network. The circuit-switched data is transmitted to the RLP unit 93. The interworking function IWF of the mobile services switching centre MSC comprises a corresponding RLP unit 94. A common traffic channel is set up between the units 93 and 94 and an RLP link comprising virtual channels (two channels in this case) has been established between the units according to the principles illustrated in FIGS. 4 to 6. The RLP unit 93 packs the circuit-switched data received from the LAC unit 92 into RLP frames which are transmitted to the RLP unit 94. The RLP unit 94 separates the data of each circuit-switched call or connection from the RLP frames and supplies them to a switching unit 95. The switching unit 95 connects the data of each call selectively to a rate adaptation function RA 96, modem 97 or telefax unit 98. The RLP unit 94, switching unit 95 and units 96 to 98 are preferably similar to the units 52, 53, 54, 55 and 56 of FIG. 4. Data transmission in the opposite direction IWF IWU-MS is substantially similar to the data transmission described above.

Figure 11:
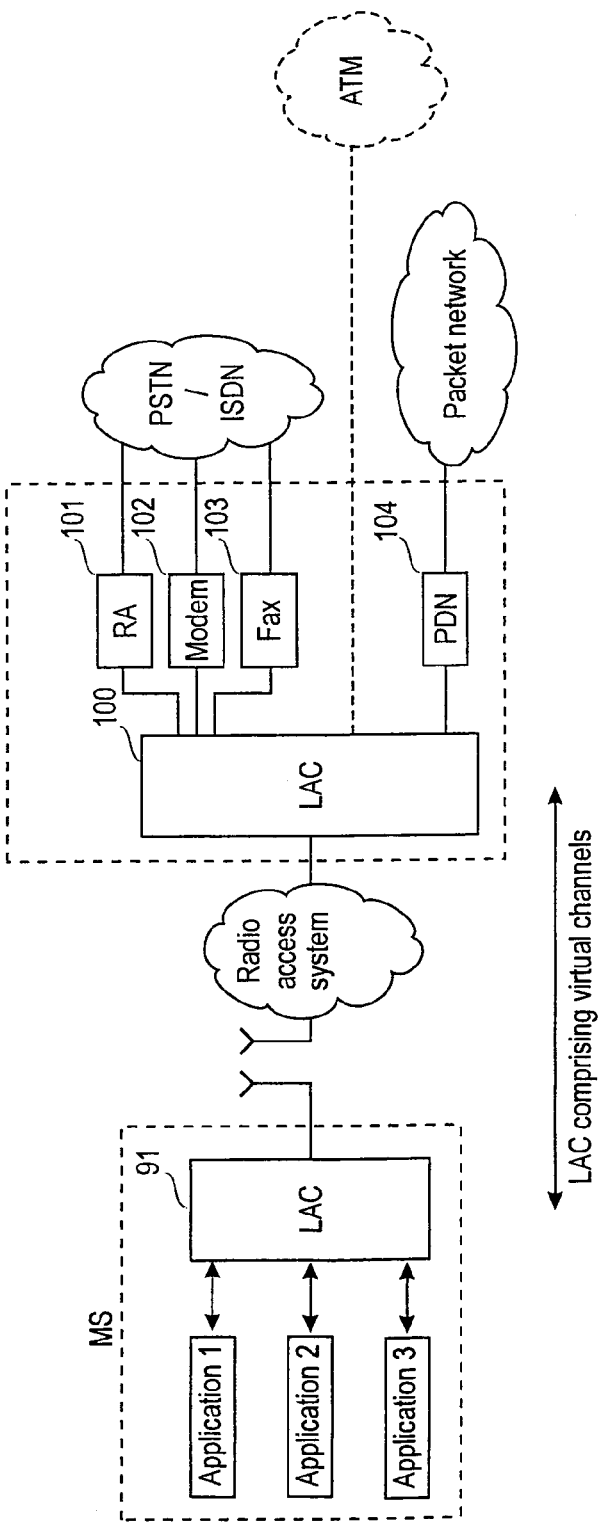
FIG. 11 illustrates a system configuration where simultaneous circuit-switched and packet-switched calls of the same mobile station MS can be implemented in a pure $3^{rd}$ generation radio access system, where IWU-A and MSC/IWF have been integrated together.

FIG. 11 illustrates transmission of circuit-switched and packet-switched calls according to the invention in a pure third generation mobile communication system. The mobile station MS is similar to that illustrated in FIG. 10. On the network side the radio access system is connected to a third generation mobile services switching centre MSC, which comprises an LAC unit 100, rate adaptation function RA 101, modem 102, telefax unit 103 and packet data node PDN 104. The LAC unit 100 is substantially similar to the LAC unit 92 of FIG. 10. According to the inventive idea, a common traffic channel and LAC link comprising virtual channels are established between the units 91 and 100. The LAC 91 packs the circuit-switched and packet-switched data transmitted by the applications 1, 2 and 3 into LAC frames, which are then transmitted to the LAC unit 100 via the common traffic channel. The LAC unit 100 separates circuit-switched data from the packet-switched data. The packet-switched data is supplied to a packet data node PDN 104 which transmits the packet data to the packet network. The circuit-switched data is supplied selectively (depending on the service the call requires) to units 101, 102 and 103 which are connected to a PSTN/ISDN network. The LAC unit 100 may also be connected to an ATM network.

Figure 12:
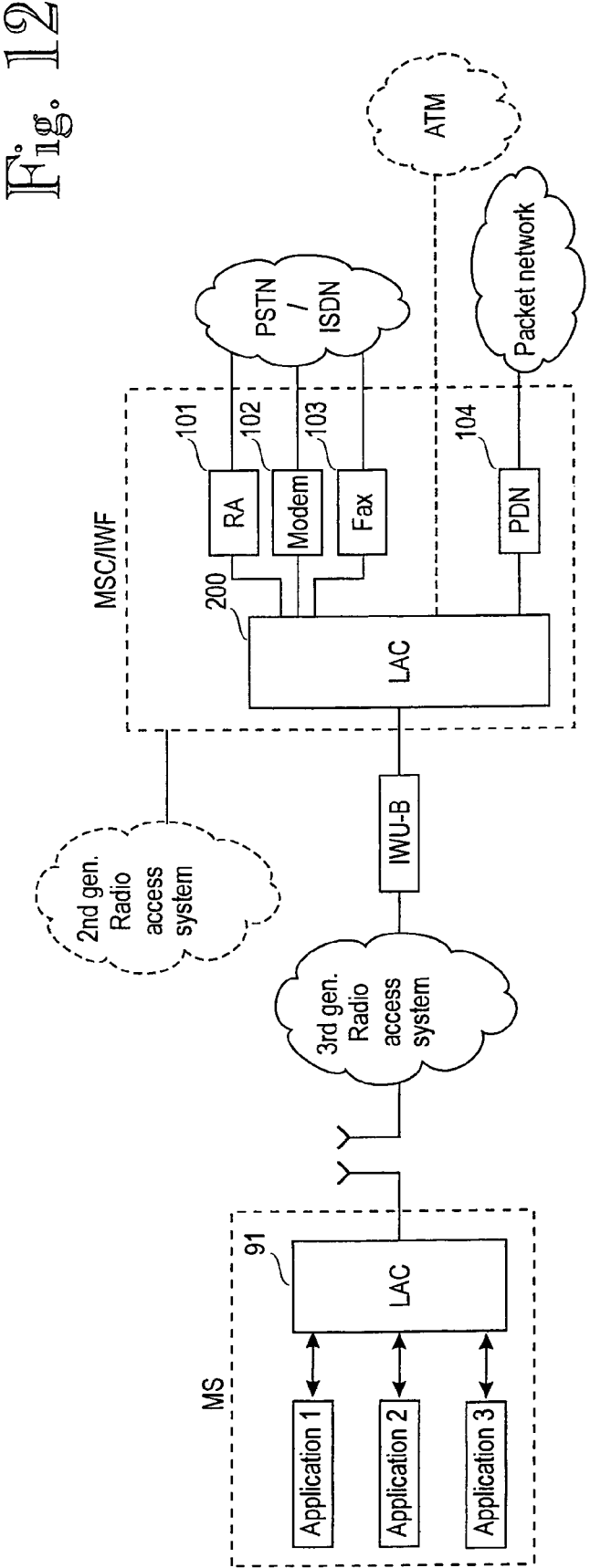
FIG. 12 illustrates a system configuration where parts of a $3^{rd}$ generation system, such as the LAC protocol, are integrated into the MC/IWF MSC/IWF of the $2^{nd}$ generation.

FIG. 12 illustrates an approach which is more integrated than that of FIGS. 9 and 10. In this approach parts of the third generation system, such as the LAC protocol 200, have been embedded in the MSC/IWF of the second generation. The packet data node PDN may also be integrated into the IWF. The add-on unit IWU-B is responsible for physical applications of the traffic channel (e.g. ATM/ISDN primary rate), any transparent rate adaptations and signalling adaptations. In the case of FIG. 12 one common traffic channel is established between the mobile station MS and the interworking function MSC/IWF. The function of the traffic channel is similar to that in a pure third generation mobile communication system, which was described with reference to FIG. 11.

Figure 13:
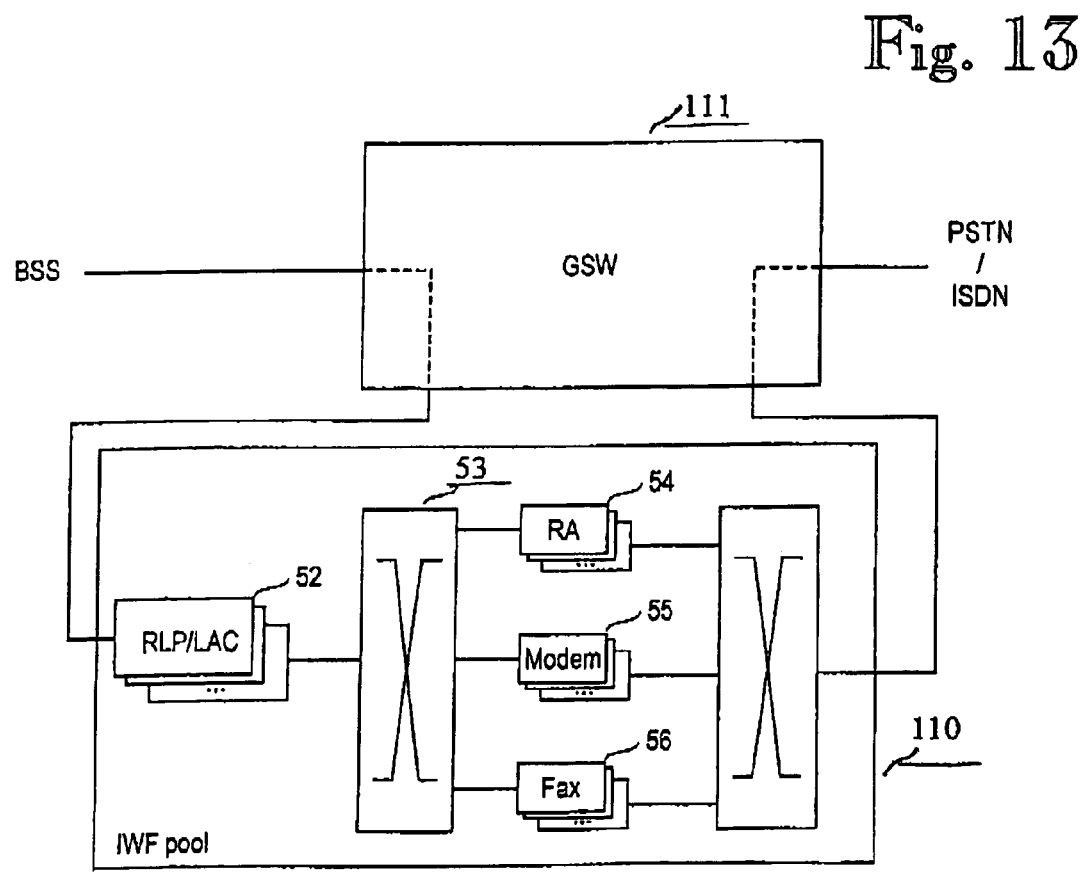
FIG. 13 is a block diagram of a mobile services switching centre which comprises an integrated IWF pool supporting the invention.

FIG. 13 illustrates a mobile services switching centre and an IWF pool which may be used in the present invention. The transmission channels to the base station system are connected to one side of the group switch GSW. The transmission channels to the PSTN/ISDN networks are connected to the other side of the GSW. The IWF pool 110 comprises a number of RLP/LAC units 52, switching unit 53, number of rate adaptation units RA 54, number of modem units 55 and number of telefax units 56. The switching unit 53 can selectively switch any RLP/LAC unit to any one of the units 54, 55 and 56 (or to more than one unit). The IWF pool also comprises a switching unit 111 for switching any one (or any ones) of the units 54, 55 and 56 selectively to the transmission channel (transmission channels) to the PSTN/ISDN network. Thus the integrated IWF pool can offer the requested service to any combination of various calls. Such a pool separates the virtual channels of simultaneous calls into physical outgoing transmission channels, each of which can use e.g. a modem, telefax function or ISDN rate adaptation function in the pool 110. The network allocates such integrated IWF pool resource 110 when a mobile station MS having a multiple call capability sets up the first call. Since the mobile services switching centre may also comprise simple IWF pools which contain only modems, UDI adapters, etc., the call set-up signalling must indicate that the MS has a multiple call capability. This indication may be included in the BCIE element, as was explained above.

In the above-described preferred embodiments of the invention the different calls or connections had a common LAC/RLP protocol inside of which logical channels were established. Alternatively, a separate LAC/RLP protocol (entity) which forms a logical channel of its own via the common traffic channel can be established for each connection or call, or for a group of two or more calls or connections. In that case the LAC/RLP frames belonging to different LAC/RLP entities can be distinguished from one another by means of the VCI identifier of FIG. 5, for example. Equipment configurations and functions can otherwise be implemented as was described above in connection with preferred embodiments, except that the RLP/LAC units process parallelly several RLP/LAC frames.

The invention has been described above by means of preferred embodiments. It should be noted that there are alternative solutions and variations which are obvious to a person skilled in the art and can be implemented without deviating from the scope and spirit of the appended

The invention claimed is:

1. A method of producing two or more simultaneous data calls for one mobile station in a mobile communication system, comprising assigning only one common traffic channel exclusively to two or more simultaneous mobile communication network calls of the mobile station, said network calls comprising transparent calls and non-transparent calls sharing a capacity of the common traffic channel exclusively between the simultaneous calls, detecting that the mobile communication network is temporarily unavailable to allocate more transmission capacity or a required transmission capacity to the common traffic channel when a new call or connection is established, allocating requested capacity to transparent calls or connections and the remaining capacity to non-transparent calls or connections when the mobile communication network is temporarily unable to allocate more transmission capacity or the requested amount of transmission capacity to the common traffic channel, and allocating requested capacity to non-transparent calls or connections later when capacity becomes available in the network.

2. A mobile communication network, comprising
- means for establishing one traffic channel of the mobile communication network for exclusive use of two or more simultaneous mobile communication network calls of a mobile station, said network calls comprising transparent calls and non-transparent calls
- means for sharing a capacity of said common traffic channel exclusively between said simultaneous calls,
- means for detecting that the mobile communication network is temporarily unable to allocate more transmission capacity or a required amount of transmission capacity to the traffic channel when a new call or connection is set up,
- means for allocating requested capacity to transparent calls or connections and the remaining capacity to non-transparent calls or connections when the mobile communication network is temporarily unable to allocate more transmission capacity or the required amount of transmission capacity to the common traffic channel, and
- means for allocating requested capacity to non-transparent calls or connections later when capacity becomes available in the network.

3. A mobile communication network, comprising
- means for establishing one traffic channel of the mobile communication network for exclusive use of two or more simultaneous mobile communication network calls of a mobile station,
- means for sharing a capacity of said common traffic channel exclusively between said simultaneous calls,
- means for negotiating between the mobile station and a network about the channel capacity needed for each call or connection, and
- means for adjusting dynamically the capacity of the common traffic channel,
- means for establishing a separate subchannel for each call or each connection of each call in said traffic channel,
- means for establishing one radio link protocol link or link access control protocol link over the traffic channel between the mobile station and the interworking function,
- means for establishing a logical link for each call or each connection of each call inside said radio link protocol link or link access control protocol link, and
- means for transmitting the user data of each call or each connection of each call via the representative logical link by transmitting the data packets of a packet-switched call interleaved with the protocol frames of the radio link protocol or link access control protocol or encapsulated in the protocol frames.

4. A network element for a mobile communication network, comprising
- means for establishing one traffic channel of the mobile communication network for exclusive use of two or more simultaneous mobile communication network calls of a mobile station, said network calls comprising transparent calls and non-transparent calls
- means for sharing a capacity of said common traffic channel exclusively between said simultaneous calls,
- means for detecting that the mobile communication network is temporarily unable to allocate more transmission capacity or a required amount of transmission capacity to the traffic channel when a new call or connection is set up,
- means for allocating requested capacity to transparent calls or connections and the remaining capacity to non-transparent calls or connections when the mobile communication network is temporarily unable to allocate more transmission capacity or the required amount of transmission capacity to the common traffic channel, and
- means for allocating requested capacity to non-transparent calls or connections later when capacity becomes available in the network.

5. A network element for a mobile communication network, comprising
- means for establishing one traffic channel of the mobile communication network for exclusive use of two or more simultaneous mobile communication network calls of a mobile station,
- means for sharing a capacity of said common traffic channel exclusively between said simultaneous calls,
- means for adjusting dynamically the capacity of the common traffic channel according to a required channel capacity defined by means of negotiation between the mobile station and the network for each call or each connection of each call,
- means for establishing a separate subchannel for each call or each connection of each call in said traffic channel,
- means for establishing one radio link protocol link or link access control protocol link over the traffic channel between the mobile station and the interworking function,
- means for establishing a logical link for each call or each connection of each call inside said radio link protocol link or link access control protocol link, and
- means for transmitting the user data of each call or each connection of each call via the respective logical link by transmitting the data packets of a packet-switched call interleaved with the protocol frames of the radio link protocol or link access control protocol or encapsulated in the protocol frames.

6. A method according to claim 1, wherein the common traffic channel comprises a common TDMA or CDMA traffic channel.

7. A mobile communication system according to claim 2, wherein the common traffic channel comprises a common TDMA or CDMA traffic channel.

8. A mobile communication network according to claim 3, wherein the common traffic channel comprises a common TDMA or CDMA traffic channel.

9. A network element according to claim 4, wherein the common traffic channel comprises a common TDMA or CDMA traffic channel.

10. A network element according to claim 5, wherein the common traffic channel comprises a common TDMA or CDMA traffic channel.

* * * * *